United States Patent Office 3,411,271
Patented Nov. 19, 1968

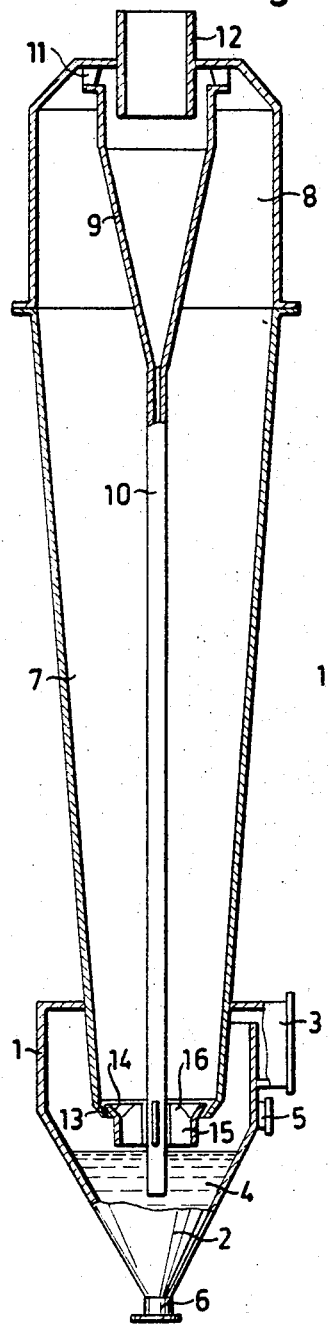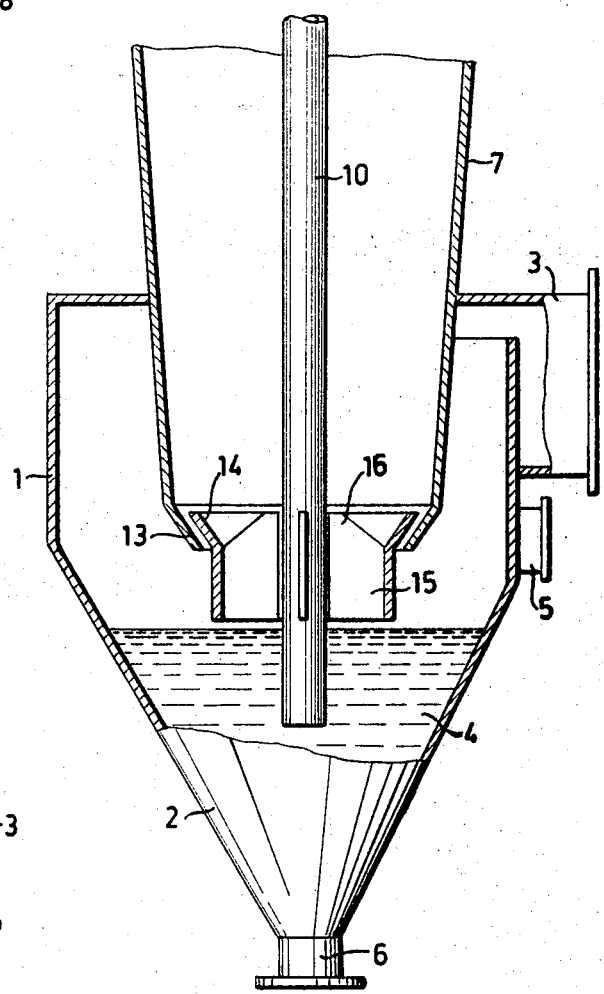

3,411,271
APPARATUS FOR BRINGING A LIQUID INTO
CONTACT WITH A GAS OR VICE VERSA
Karl-Axel Goran Gustavsson, Enkoping, Sweden, assignor to Aktiebolaget Bahco, Lilla Essingen, Stockholm, Sweden
Filed Sept. 19, 1966, Ser. No. 580,339
Claims priority, application Sweden, Oct. 7, 1965,
13,042/65
4 Claims. (Cl. 55—226)

ABSTRACT OF THE DISCLOSURE

An apparatus for contacting a liquid and a gas comprising a partially filled liquid container, a gas inlet directing the gas at right angles to the liquid surface, and a treatment channel disposed within the container at right angles to the liquid surface and having annular gap means adjacent its lower end for the flow of substantially liquid-free gas therethrough, and a droplet separator within the upper portion of said channel.

---

The present invention relates to an apparatus for bringing a liquid into contact with a gas by suspending the liquid in droplet form in a substantially vertically upwardly flowing gas. The purpose of the desired contact between liquid and gas may be, for instance, to vaporize the liquid, to cool the gas or to effect absorption of the constituents in the gas into the liquid.

A previously suggested apparatus for providing for such contact includes a container adapted to hold a liquid mass and provided with a gas inlet so arranged that the gas is caused to flow substantially at right angles, down towards the surface of the liquid in the container, and a treatment channel directed substantially at right angles to the surface of the liquid, through which channel the gas flows substantially linearly away from the surface of the liquid whilst entraining droplets from the same, the cross-section of said channel increasing upwardly along a major portion of its length.

The liquid droplets, which in an apparatus of this type are entrained by the gas, are naturally of varying size. By reason of the fact that the treatment channel, whereby the mixture of gas and liquid droplets flow upwards from the liquid mass, is designed with an upwardly increasing cross-section, as a diffuser the gas obtains an upwardly decreasing flow velocity, whereby droplets of varying size are held suspended at different levels in the diffuser. The active contact surface between the gas and the liquid is thus formed by the surface of the suspended liquid droplets, and consequently the contact period is a long one.

A constant liquid exchange occurs in the diffuser (treatment channel) in that droplets agglomerate and form larger droplets which then sink to a level corresponding to the greater velocity of suspension of these larger droplets, or, if their size is sufficient, fall down once more into the liquid mass. At the same time certain droplets are disintegrated into smaller droplets, which follow the gas to a higher level, or if their size is so small that the velocity of suspension is lower than the velocity of the gas at the upper end of the diffuser, said drops follow with the departing gas. For the purpose of returning such droplets to the liquid mass at the lower end of the treatment channel a droplet separator, e.g. of the cyclone type, is arranged at the upper end of said treatment channel, the liquid outlet of said droplet separator passing back to the liquid mass.

The process can be controlled by adjusting the level of the liquid in the container relative to the lower end of the diffuser because the size of the droplets is substantially a function of the distance from the level of the liquid to the lower end of the diffuser. It has been proved, however, that the process is very sensitive to variations in this distance so that a truly efficient action for a given amount of supplied gas per unit of time is only obtained within a very close range for this distance. The process is thus difficult to control in a desired manner. Further, it has been proved that an apparatus of given dimensions functions best within rather small ranges of gas supply.

The present invention is intended to make the apparatus more easily controllable and at the same time be better suited for use when the supply of gas is greatly varied. This is achieved by arranging an annular gap close to the lower end of the diffuser-shaped treatment channel, at such a height above the normal level of the liquid that a substantially liquid-free partial gas flow penetrates through the gap. This annular gas flow causes the liquid droplets in the treatment channel to be acted upon in such a way that they are broken down into considerably smaller droplets, whereby the amount of liquid existing in droplet form in the treatment channel substantially increases. Consequently the apparatus becomes less sensitive to variations in the liquid level and at the same time also functions well when the supply of gas varies.

A further improvement is obtained if the portion of the outlet channel positioned below the gap is designed as a vertically movable stub pipe, the position of which can be vertically adjusted. The stub pipe may thus be made freely movable so that it automatically adjusts the width of the gap under the influence of the flow of gas.

An embodiment of the invention is illustrated in the accompanying drawings, FIG. 1 shows a vertical longitudinal section of an apparatus according to the invention. FIG. 2 shows, in the same way, the lower portion of the apparatus in larger scale.

The shown apparatus includes a container having a substantially cylindrical upper portion 1 and a conical lower portion 2. A gas inlet duct 3 is arranged at the upper portion 1 of the container so that gas flows substantially uniformly distributed into the container 1 and at right angles down to the liquid mass 4 contained therein. The liquid may be introduced into the apparatus through an inlet 5 and the level of said liquid is determined by a spill-way (not shown). A lower outlet 6 allows the liquid to be drained away when required.

The lower end of a diffuser-shaped treatment channel 7 coaxial with the container projects down into the container 1, 2, and flares out conically from said lower end. The height of the channel 7 is several times greater than its inlet diameter and the diameter at its upper end reaches at least twice the diameter of the inlet. The channel is terminated with an upwardly closed cylindrical upper portion 8.

Inside the cylindrical upper portion 8 is placed a droplet separator 9 in the form of a jacket coaxial with the channel 8 and cylindrically shaped at the top and conically shaped at the bottom, a liquid outlet conduit 10, coaxial with the diffuser (treatment channel), being connected to said jacket, and the lower end of said liquid outlet conduit being located below the surface of the liquid in the container 1, 2. The upper edge of the droplet separator 9 is situated at a distance from the upper walls of the upper portion 8 for the purpose of forming a peripheral inlet gap in which baffles 11 are inserted, said baffles 11 imparting a rotary motion to the gas flowing from the diffuser to the droplet separator. A gas outlet 12 is arranged within the jacket 9.

The treatment channel 7 is connected at the bottom with an obliquely inwardly folded flange 13 which forms a seating for an outwardly folding flange 14 at the upper end of a short, substantially cylindrical stub pipe 15 which forms the lowermost portion of the gas outlet channel. This lower portion is provided with radial blades 16, which bear against the lower portion of the tube 10, and can be moved upwards from the position wherein the flange 14 rests against the flange 13.

When the gas is introduced through the inlet 3 it flows down to the surface of the liquid and then up through the treatment channel 7 whilst entraining liquid droplets which float at different heights in the same so that the channel is kept filled with a mixture of gas and liquid. At the same time the stub pipe 15 is lifted so that a gap is opened between the flanges 13 and 14. A partial gas flow, substantially free from liquid, flows in through said gap, which in the manner described above increases the effectiveness of the functioning of the apparatus. When the gas flow increases the stub pipe is lifted further so that the gap automatically increases. In this way the apparatus becomes self-regulating.

In addition to serving as guides the blades 16 also serve to prevent possible rotation of the gas, liable to occur when the gas flows in through the central opening.

The described embodiment relates to an automatically adjustable gap but the gap, however, may also be stationary or may be so adapted that it can be adjusted from without by means of some suitable device.

I claim:

1. An apparatus for contacting a liquid and a gas comprising a container adapted to hold a body of liquid therein, a gas inlet to said container arranged so that gas passing therethrough is caused to flow at substantially right angles towards the surface of the liquid in said container, a vertically extending treatment channel mounted substantially centrally of said container, the lower end of said treatment channel being spaced above the level of said liquid body, an inwardly directed flange portion at the lower end of said treatment channel, a stub pipe having an outwardly directed flange at the upper end thereof, said pipe and said channel being so mounted that said flanges interengage whereby gas striking the surface of said liquid will cause said flanges to be separated thereby forming an annular gap therebetween, said gap being at such a height above said level that substantially liquid-free gas flows into said treatment channel through said gap.

2. An apparatus according to claim 1 wherein said treatment channel has a height several times greater than the diameter of the lower end thereof, and the diameter of the upper end is at least twice the diameter of the lower end.

3. An apparatus for contacting a liquid and a gas comprising a container adapted to hold a body of liquid therein, a gas inlet to said container arranged so that gas passing therethrough is caused to flow at substantially right angles towards the surface of the body of liquid in said container, a vertically extending and conically flaring treatment channel mounted substantially centrally of said container, the lower end of said treatment channel being spaced above the level of the liquid body, means at the lower end of said treatment channel forming an annular gap close to the lower end of said channel at such a height above said level that substantially liquid-free gas flows in through said gap, and a droplet separator mounted coaxially within said treatment channel, said droplet separator comprising a conically shaped portion at the upper end thereof and a liquid outlet conduit depending therefrom coaxially within said separator and depending below said liquid level in said container.

4. An apparatus according to claim 3 further comprising a gas outlet arranged coaxially with said droplet separator at the top of said treatment channel.

References Cited

UNITED STATES PATENTS

| 585,568 | 6/1897 | Greiwe | 55—260 XR |
| 587,425 | 8/1897 | Briggs | 261—126 |
| 1,267,715 | 5/1918 | Tutwiler | 55—415 XR |
| 2,222,930 | 11/1940 | Arnold | 55—416 XR |

FOREIGN PATENTS

| 660,531 | 5/1938 | Germany. |
| 411,122 | 5/1934 | Great Britain. |

HARRY B. THORNTON, *Primary Examiner.*

T. R. MILES, *Assistant Examiner.*